United States Patent [19]
Wolf et al.

[11] Patent Number: 4,807,739
[45] Date of Patent: Feb. 28, 1989

[54] METHOD OF AND APPARATUS FOR TRANSPORTING AND TURNING STACKS OF PAPER SHEETS

[75] Inventors: Wolfram Wolf, Bilsen; Klaus Reissman; Horst Lembcke, both of Hamburg, all of Fed. Rep. of Germany

[73] Assignee: E. C. H. Will (GmbH & Co.), Hamburg, Fed. Rep. of Germany

[21] Appl. No.: 11,935

[22] Filed: Feb. 6, 1987

[30] Foreign Application Priority Data

Feb. 12, 1986 [DE] Fed. Rep. of Germany ....... 3604316
Aug. 20, 1986 [DE] Fed. Rep. of Germany ....... 3628235

[51] Int. Cl.$^4$ ............................................. B65G 47/24
[52] U.S. Cl. .................................... 198/415; 198/572
[58] Field of Search ..................... 198/415, 689.1, 817, 198/572; 271/227, 265

[56] References Cited

U.S. PATENT DOCUMENTS

| | | | |
|---|---|---|---|
| 3,084,090 | 4/1963 | Rambo et al. ................. | 198/415 X |
| 3,254,778 | 6/1966 | Marland et al. ................ | 198/579 X |
| 3,890,508 | 6/1975 | Sharp .............................. | 198/394 X |
| 3,933,237 | 1/1976 | Rotterman ..................... | 198/572 X |
| 4,672,792 | 6/1987 | Wallin ............................ | 198/689.1 |
| 4,676,361 | 6/1987 | Heisler ........................... | 198/415 X |

FOREIGN PATENT DOCUMENTS

| | | |
|---|---|---|
| 77454 | 4/1983 | European Pat. Off. . |
| 1289487 | 2/1969 | Fed. Rep. of Germany . |
| 219712 | 3/1985 | German Democratic Rep. ................................ 198/415 X |
| 2144698 | 10/1986 | United Kingdom . |

*Primary Examiner*—Robert J. Spar
*Assistant Examiner*—Cheryl L. Gastineau
*Attorney, Agent, or Firm*—Peter K. Kontler

[57] ABSTRACT

Successive stacks of paper sheets are turned during travel along two parallel paths one of which is defined by a first conveyor and the other of which is defined by a set of two or more consecutive conveyors. The speed of the conveyor or conveyors defining one of the paths is greater than the speed of the conveyor or conveyors defining the other path so that the orientation of stacks changes during travel along the two paths. The orientation of successive stacks in at least one intermediate portion of each path is monitored by a battery of photoelectronic detectors whose signals are processed to ascertain whether or not the monitored orientation matches a desired intermediate orientation. The processed signals are used to change the speed of the conveyor or conveyors which define at least one of the paths so as to ensure that each stack assumes a predetermined orientation at the latest on reaching the ends of the two paths.

22 Claims, 4 Drawing Sheets

METHOD OF AND APPARATUS FOR TRANSPORTING AND TURNING STACKS OF PAPER SHEETS

BACKGROUND OF THE INVENTION

The present invention relates to a method of and to an apparatus for turning (changing the orientation) of stacks of sheets and/or panels which are made of paper and/or other materials. More particularly, the invention relates to improvements in methods of and in apparatus for turning stacks of paper sheets or the like in such a way that two discrete parts of a stack to be turned rest on conveyors which define two elongated parallel paths and one of the conveyors is faster than the other conveyor. Conventional turning apparatus whose operation is based on the above principle are disclosed, for example, in German Offenlegungsschrift No. 32 21 601.

It is often necessary or desirable to turn stacks of paper sheets or the like through 90°, through 180° or through another angle during transport from a preceding station to the next-following station in a production line wherein the stacks are formed and/or processed, e.g., in a production line for the making of stationery products in the form of exercise pads, accumulations of maps, charts and the like as well as during the making and/or treatment of pamphlets, brochures, books, booklets and similar products. As a rule, the stacks are transported in such positions that their sheets and/or panels are horizontal or nearly horizontal, i.e., it is necessary to turn the stacks about vertical or nearly vertical axes extending at right angles to the planes of the respective sheets. The aforementioned Offenlegungsschrift discloses a turning apparatus wherein two elongated parallel conveyors define two parallel paths and the stacks are deposited on the conveyors in such a way that a first part of the lowermost sheet or panel contacts one of the conveyors while another part of the lowermost sheet or panel contacts the other conveyor. The conveyors are driven at different speeds, and the difference between the two speeds will determine the extent to which the orientation of a stack is changed during travel along the two paths. It has been found that the just described conventional apparatus cannot ensure a predictable change of orientation of a long or even a short series of successive stacks. The reason is that (in addition to the difference between the speeds of the two conveyors) the extent to which a stack will be turned depends on a variety of parameters such as friction between the lowermost sheet of a stack and the adjacent conveyors, the area of contact between the lowermost sheet and the conveyors, the original orientation of a stack and others. Therefore, it is invariably necessary to correct the orientation of stacks which have completed their travel through a conventional turning mechanism. Accurate orientation of stacks which have advanced beyond a conventional turning apparatus is not only desirable but often critical, e.g., when the stacks are to be admitted into a trimming machine or into a packing machine. Prior proposals include the provision of mechanical orientation correcting means in the form of stops, guide rails, endless belts which travel along the path for a freshly oriented stack downstream of the turning apparatus, and others.

OBJECTS AND SUMMARY OF THE INVENTION

An object of the invention is to provide a novel and improved method of turning successive stacks of a short or long series of stacks in such a way that the orientation of turned stacks will be nearer to the desired final orientation than in accordance with heretofore known methods.

Another object of the invention is to provide a method which renders it possible to deliver freshly turned stacks to a packing or trimming machine without any corrective undertakings.

A further object of the invention is to provide a method which ensures predictable changes in orientation of successive stacks during travel along relatively short paths and in such a way that the orientation can be changed in a single stage or in a plurality of successive stages.

An additional object of the invention is to provide a novel and improved turning apparatus for the practice of the above outlined method and to construct and assemble the apparatus in such a way that it can reliably turn stacks at a high frequency as well as with a heretofore unmatched degree of accuracy.

Still another object of the invention is to provide the apparatus with novel and improved conveyor means for transporting the stacks in the course of the turning operation.

A further object of the invention is to provide novel and improved drive means for the conveyor means.

An additional object of the invention is to provide the apparatus with novel and improved means for monitoring the orientation of stacks in the course of the tuning operation.

Another object of the invention is to provide the apparatus with novel and improved means for preventing stray movements of the stacks with reference to the conveyors.

An additional object of the invention is to provide a production line which embodies the above outlined apparatus.

A further object of the invention is to provide an apparatus which can deliver reoriented stacks to next apparatus or to next groups of apparatus in an optimum orientation without the need for any corrective measures which would contribute to the bulk and initial and maintenance cost of the apparatus as well as to the danger of affecting the appearance and/or other desirable characteristics of the stacks.

Another object of the invention is to provide an apparatus which, though particularly suitable for turning stacks of superimposed sheets or panels of paper or the like, can be used with equal or similar advantage for turning other types of objects, such as solid blocks of metallic, plastic and/or other material.

An additional object of the invention is to provide novel and improved means for adjusting the operation of conveyors in the above outlined apparatus.

A further object of the invention is to provide an apparatus which is constructed and assembled in such a way that one or more sheets of a stack which become misaligned during a first stage of the turning operation can automatically reassume their proper positions relative to the other sheets during the next stage or stages of the turning operation.

An additional object of the invention is to provide an apparatus and a method which, though especially suited for turning stacks of superimposed sheets and/or panels, can be used with equal or similar advantage for turning one-piece commodities or commodities whose constituents are non-movably connected to each other.

One feature of the present invention resides in the provision of a method of turning stacks of paper sheets or the like, and more particularly of a method of changing the orientation of stacks by rotating them about axes which are normal to the planes of their sheets. The method comprises the steps of establishing parallel elongated first and second paths, delivering successive stacks into first portions of the paths so that a first part of each stack overlies the first path while a second part of the same stack simultaneously overlies the second path, advancing the first and second parts of successive stacks along the respective paths in the same direction but at different speeds so that the stacks are turned as a result of the difference in speeds of their first and second parts, monitoring the orientation of successive stacks in second portions of the paths downstream of the first portions, comparing the monitored orientation of successive stacks with a reference value denoting the desired orientation of stacks in the second portions of the paths, and changing the speed of advancement of the first part of a stack along the first path (and/or the speed of advancement of the second part of such stack along the second path) when the monitored orientation of the stack deviates from the desired orientation so that each stack assumes a predetermined orientation at the latest (i.e., not later than) upon completion of advancement along the two paths.

The speed changing step can include increasing or reducing the speed of the parts of stacks overlying the first path only downstream of the second portion of the first path. Alternatively, the speed changing step can include increasing or reducing the speed of the parts of stacks overlying the first path only upstream or upstream and downstream of the first portion of the first path.

The speed changing step can include reducing the speed of advancement of the first part of a stack along the first path.

Another feature of the invention resides in the provision of an apparatus for turning stacks of paper sheets or the like. The apparatus comprises means for transporting successive stacks in a predetermined direction including first conveyor means defining an elongated first path and a plurality of second conveyor means jointly defining successive sections of an elongated second path which is parallel to and adjacent the first path, and drive means for driving the conveyor means in a predetermined direction at different speeds so that a stack which is deposited on the first conveyor means and simultaneously rests on at least one of the second conveyor means is turned when the first conveyor means and the one second conveyor means are driven at different speeds.

The drive means is adjustable, and the apparatus further comprises means for monitoring the orientation of stacks in predetermined portions of the first and second paths and for generating signals which denote the monitored orientation of stacks. Such apparatus further comprises means for adjusting the drive means in response to signals from the monitoring means so as to cause each stack to assume a predetermined orientation at the latest upon completion of advancement along the first and second paths.

The adjusting means can include means for changing the difference between the speed of the first conveyor means and the speed of at least one of the second conveyor means in response to signals from the monitoring means when the monitored orientation of a stack deviates from a desired (intermediate) orientation in the predetermined portions of the first and second paths.

The second conveyor means includes at least one upstream conveyor means which is disposed ahead of the predetermined portion of the second path and at least one downstream conveyor means disposed past the predetermined portion of the second path. The adjusting means can include means for changing the difference between the speed of the first conveyor means and the speed of the downstream conveyor means. Such adjusting means preferably includes means for changing the speed of the downstream conveyor means.

The adjusting means can further include means for changing the difference between the speed of the first conveyor means and the speed of the upstream conveyor means so that the orientation of a stack which follows a previously monitored stack matches or approximates a desired intermediate orientation on arrival of the following stack in the predetermined portions of the two paths. The adjusting means of such apparatus preferably comprises means for changing the speed of the upstream conveyor means.

The monitoring means can comprise a plurality of detectors (e.g., detectors which include optoelectronic transducers) forming a line or row which is inclined with reference to the predetermined direction of advancement of stacks along the two paths. One of the detectors is arranged to generate a signal ahead of another detector when the orientation of a stack arriving in the predetermined portions of the two paths deviates from a predetermined intermediate orientation, and the monitoring means of such apparatus further comprises means for generating additional signals denoting the length of intervals between the generation of signals by the one and the other detector. Thus, the additional signals are indicative of the extent of deviation of monitored orientation from the predetermined intermediate orientation. The adjusting means is responsive to the additional signals.

One side face of each stack which advances along the two paths is first to reach the predetermined portions of the two paths. The detectors are or can be arranged to monitor the orientation of the one side face of each stack which reaches the predetermined portions of the two paths.

The drive means can comprise a power train for the conveyor means, overrunning clutches between the power train and the second conveyor means, change-speed or variable-speed transmission means which is driven by the power train or receives torque from a discrete prime mover, and additional clutch means for connecting the transmission means with at least one of the second conveyor means. The adjusting means then includes means for changing the ratio of the transmission means or the speed of the discrete prime mover. The drive means can further comprise an additional change-speed transmission for the downstream conveyor means in the second path.

At least one conveyor means can comprise an endless belt or chain conveyor, e.g., a toothed belt conveyor. At least one of the conveyor means can include a foraminous conveyor and means (e.g., including a suction chamber) for establishing a pressure differential across the foraminous conveyor so that the latter attract the stacks in the corresponding portion of the respective path.

The drive means can include means for driving the conveyor means in the first and second paths at different speeds such that a stack which has completed its advance along the two paths has changed its orientation through an angle of approximately or exactly 180°.

The transporting means can constitute one element of an elongated production line having two or more additional elements, e.g., means for feeding stacks to the first and second paths, means for receiving turned stacks from the transporting means, means for accumulating stacks ahead of the feeding means and means for wrapping and/or otherwise processing stacks downstream of the receiving means. The transporting means can be disposed close to or exactly at the middle of the production line.

At least one of the conveyor means (for example, all of the conveyor means) can comprise a plurality of parallel endless belt or chain conveyors. For example, the parallel conveyors can be disposed in one of the paths so that one of the parallel conveyors is nearer to the other path than the other parallel conveyor. The drive means then includes means for driving the one conveyor at a speed which is less than the speed of the other parallel conveyor. The difference between the speeds of the parallel conveyors is proportional to differences between the distances of the parallel conveyors from the other path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
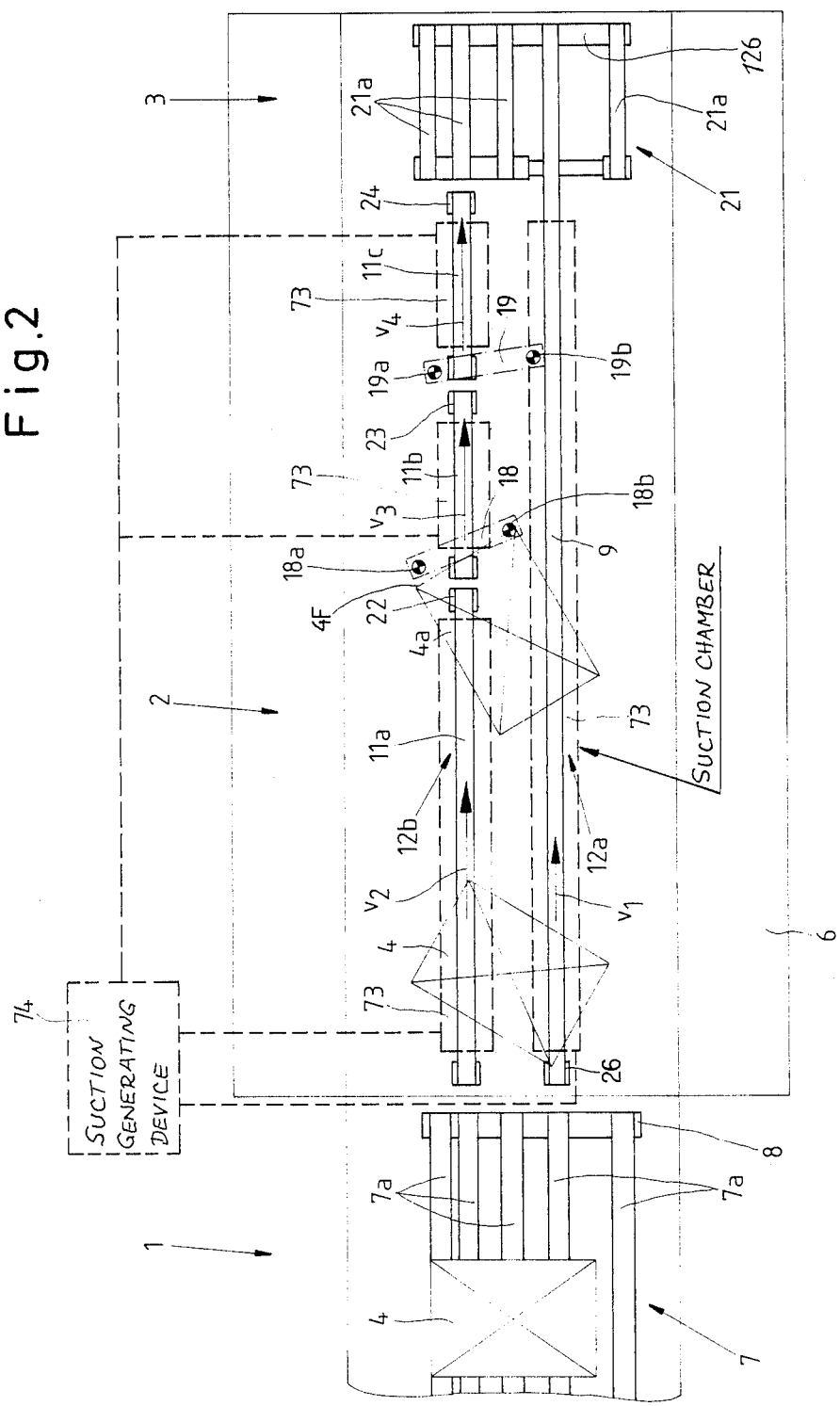
FIG. 2 is an enlarged plan view of a portion of a production line which embodies the apparatus of FIG. 1, a first stack being shown on the feeding conveyor, a second stack being shown at the upstream ends of the two paths, and a third stack being shown in the range of a first monitoring unit at the downstream end of the upstream conveyor means of a set of conveyor means defining the second path.

Referring first to FIG. 2, the apparatus of the present invention can constitute or form part of an elongated production line comprising a feeding conveyor 1 which delivers a series of at least slightly spaced-apart stacks 4 of paper sheets or the like to a combined transporting and turning (orientation changing) unit 2, and the latter delivers turned stacks 4 to a receiving conveyor 3. The conveyors 1, 3 and the transporting unit 2 are mounted on a machine frame 6 one after the other as seen in the direction of arrows.

The feeding conveyor 1 comprises a group 7 of several endless belt or chain conveyors 7a which are disposed in parallel vertical planes and are trained over at least two pulleys 8 (only one can be seen in FIG. 2). The conveyors 7a are driven by a common prime mover, e.g., a variable-speed electric motor (not shown). These conveyors are not shown in FIG. 3 for the sake of clarity. Such belt conveyors constitute but one of several types of conveyors which can be used to feed a succession of stacks 4 to the receiving end of the transporting unit 2. For example, the conveyors 7a can be replaced by or used jointly with one or more rows of idler rollers or driven rollers.

The transporting unit 2 comprises first conveyor means having an endless belt or chain conveyor 9 which defines a first elongated path 12a, and second conveyor means having three endless belt or chain conveyors 11a, 11b, 11c which are disposed one after the other as seen in the direction of travel of stacks 4 from the conveyor 1 toward the conveyor 3 and jointly define a second elongated path 12b which is somewhat spaced apart from and parallel to the path 12a. The drive means (shown in FIG. 1) for the conveyors 9, 11a–11c. includes means for driving the conveyor 9 at a first speed $v_1$ and means for driving the conveyors 11a–11c at the speed $v_1$ or at different speeds, particularly at speeds $v_2$, $v_3$ and $v_4$, respectively. The lengths of arrows next to the characters $v_1$, $v_2$, $v_3$ and $v_4$ denote the differences between such speeds. These arrows further denote the directions of travel of adjoining parts of stacks 4 along the respective paths. The speed $v_2$ is greater than the speed $v_1$, and at least the speeds $v_3$ and $v_4$ are variable. As a rule, the speeds $v_3$ and $v_4$ will exceed the speed $v_1$.

The apparatus further comprises means for monitoring the orientation of successive stacks 4 in two spaced-apart portions of the paths 12a and 12b. The first monitoring means is shown at 18 and comprises a row of, for example, two photoelectronic detectors 18a, 18b. The second monitoring means is shown at 19 and comprises a row or line of, for example, two photoelectronic detectors 19a and 19b. The rows or lines which are defined by the detectors of the monitoring means 18 and 19 are inclined with reference to the longitudinal directions of the paths 12a and 12b. The monitoring means 18 is disposed at the downstream end of the first or upstream conveyor 11a, and the monitoring means 19 is disposed at the downstream end of the first downstream conveyor 11b of the series of conveyors 11a–11c which define the path 12b. If the inclination of the front end face 4F of a stack (4a) approaching the monitoring means 18 matches the inclination of the row of detectors 18a, 18b with reference to the longitudinal directions of the paths 12a and 12b, the (first intermediate) orientation of such stack 4a is proper and the speed of the conveyor 9, 11a and/or 11b need not be changed. Analogously, if the inclination of the front side face 4F of a stack 4 which advances into the range of the monitoring means 19 matches the inclination of the row of detectors 19a, 19b, the (second intermediate) orientation of such stack is proper and the speed of the conveyor 9, 11b and/or 11c need not be changed because the stack will reach the receiving conveyor 3 in a predetermined (final) orientation, e.g., at an angle of 180 degrees with reference to its orientation on the feeding conveyor 1.

The receiving conveyor 3 comprises a group 21 of endless chain or belt conveyors 21a plus the foremost part of the conveyor 9. The conveyors 9 and 21a have a common front sprocket wheel or pulley 126 and are driven at the same speed. The conveyor 3 is followed by additional conveyors, not shown, which transport properly oriented stacks 4 to storage, to one or more additional processing (e.g., wrapping and packaging) stations or to other destinations.

The conveyor 11a is trained over a front sprocket wheel or pulley 22, the conveyor 11b is trained over a front sprocket wheel or pulley 23 25 and the conveyor 11c is trained over a front sprocket wheel or pulley 24. For the sake of simplicity, the following description will refer to conveyors 7a, 9, 11a, 11b, 11c and 21a as if they were in the form of endless belts (particularly toothed belts); however, some or all of these conveyors can constitute endless chains without departing from the spirit of the invention.

The rear pulley 26 for the conveyor 9 and the front pulleys 8, 22, 23, 24 are driven when the respective conveyors are in motion. However, it is clear that these conveyors can be driven by other pulleys, e.g., by pulleys which are disposed at levels below those of the pulleys 8, 22-24 and 126, i.e., the above-enumerated pulleys 8, 22-24 and 126 can constitute idler pulleys.

Figure 1:
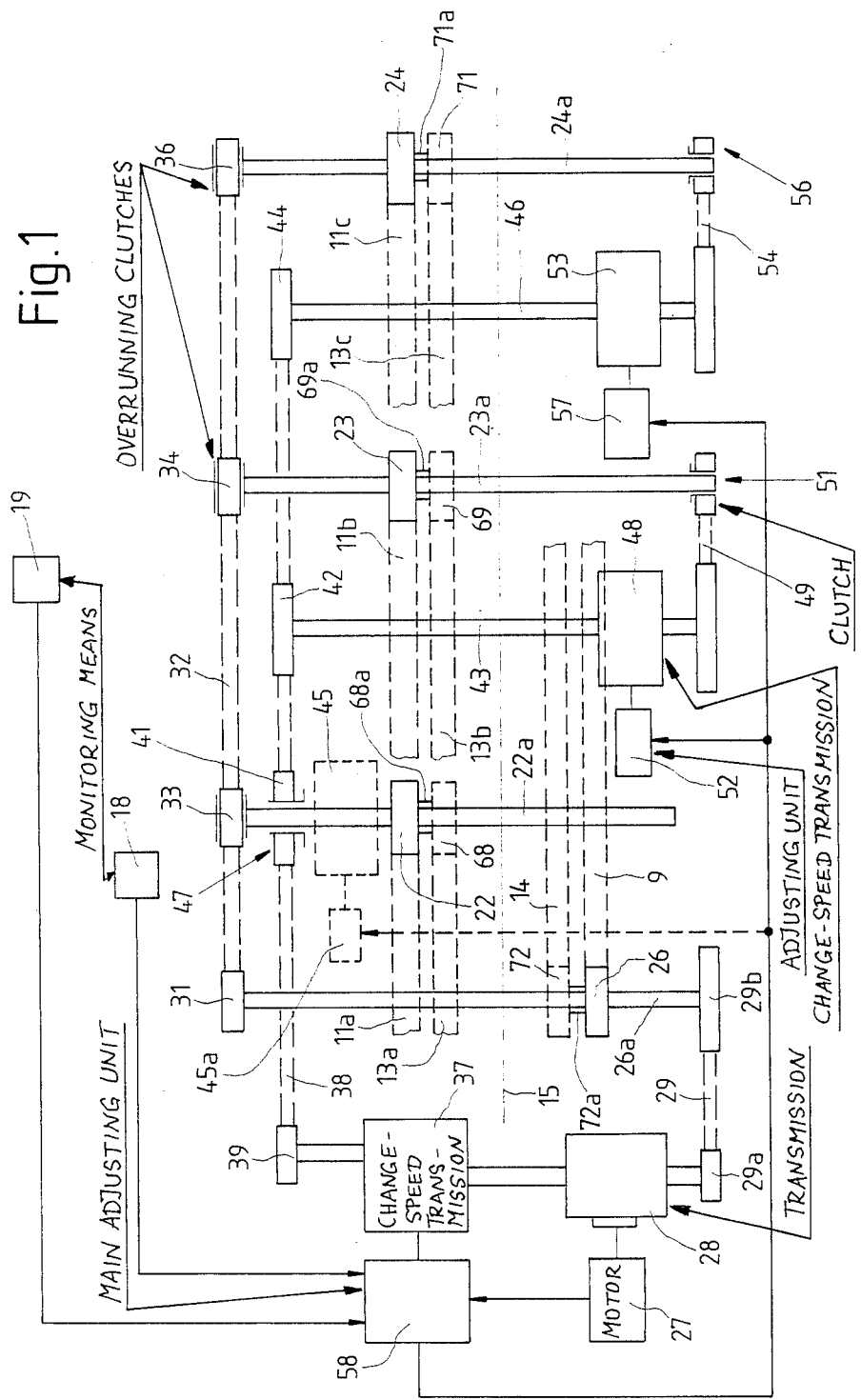
FIG. 1 is a diagrammatic plan view of the transporting means, drive means and adjusting means in one embodiment of the improved apparatus.

The details of drive means for the conveyors 9, 11a-11c (shown schematically by broken lines) of the transporting unit 2 are illustrated in FIG. 1. The spatial relationship of the elements of such drive means need not correspond to that which is shown schematically in FIG. 1.

The drive means comprises a power train including a main prime mover 27 (e.g., the main prime mover of the production line including the improved apparatus) and a transmission 28 with several outputs and an input receiving torque from the prime mover 27. One output of the transmission 28 transmits torque to the rear pulley 26 for the conveyor 9 by way of a belt or chain drive including a belt or chain 29, pulleys or sprocket wheels 29a, 29b and a shaft 26a which is common to the pulley 26 and pulley or sprocket wheel 29b. As mentioned above, the conveyor 9 is driven at the speed $v_1$. The shaft 26a further transmits torque to front pulleys 22, 23, 24 for the conveyors 11a, 11b, 11c through the medium of the shaft 26a, a pulley 31 on the shaft 26a, pulleys or sprocket wheels of overrunning clutches 33, 34, 36 and an endless belt or chain 32. The pulleys or sprocket wheels of the overrunning clutches 33, 34, 36 are mounted on shafts 22a, 23a, 24a. When the shafts 22a, 23a, 24a for the front pulleys 22, 23, 24 of the conveyors 11a, 11b, 11c respectively driven by the overrunning clutches 33, 34, 36, the speed of the conveyors 11a-11c matches the speed $v_1$ of the conveyor 9 so that a stack 4 which is fed by the conveyor 1 onto the conveyors 9, 11a is simply transported toward and onto the receiving conveyor 3 without any change of orientation, i.e., without any turning about an axis which is normal to the sheets of the stack.

The drive means for the conveyors 9 and 11a-11c further comprises a change-speed (variable-speed) transmission 37 whose input element derives motion from a second output of the transmission 28 and which can drive three pulleys or sprocket wheels 41, 42, 44 on shafts 22a, 43, 46, respectively, through the medium of a pulley or sprocket wheel 39 and an endless belt or chain 38. The pulley or sprocket wheel 41 has an axial passage for the shaft 22a and carries a clutch 47 which can be engaged to establish a torque transmitting connection between the belt or chain 38 and the shaft 22a for the front pulley 22 of the conveyor 11a. If the clutch 47 is engaged, the pulley 22 is driven by the change-speed transmission 37 whereby the conveyor 11a is running at the speed $v_2$ which is higher than the speed $v_1$ of the conveyor 9; at such time, the overrunning clutch 33 enables the shaft 22a to rotate relative to the belt or chain 32. It is assumed here that the change-speed transmission 37 is a step-up transmission.

The pulley or sprocket wheel 42 can drive the shaft 23a, and hence the conveyor 11b, through the medium of a shaft 43, a change-speed transmission 48, a belt or chain drive 49 and a clutch 51. The ratio of the transmission 48 can be varied by an adjusting unit 52. When the clutch 51 is engaged, the conveyor 11b is driven at the speed $v_3$ which is variable by the adjusting unit 52; at such time, the overrunning clutch 34 enables the pulley 23 to rotate relative to the chain 32.

The pulley or sprocket wheel 44 can drive the front pulley 24 for the conveyor 11c by way of a shaft 46, a change-speed transmission 53, a belt or chain drive 54 and a clutch 56. The ratio of the transmission 53 can be changed by an adjusting unit 57. When the clutch 56 is engaged, the conveyor 11c is driven at the speed $v_4$ which is variable by the adjusting unit 57.

The adjusting units 52 and 57 are connected with a main adjusting unit 58 which receives signals from the detectors 18a, 18b of the monitoring means 18 as well as from the detectors 19a, 19b of the monitoring means 19 and can transmit signals to the change-speed transmission 37 as well as to the adjusting units 52, 57 for the change-speed transmissions 48, 53.

Figure 4:
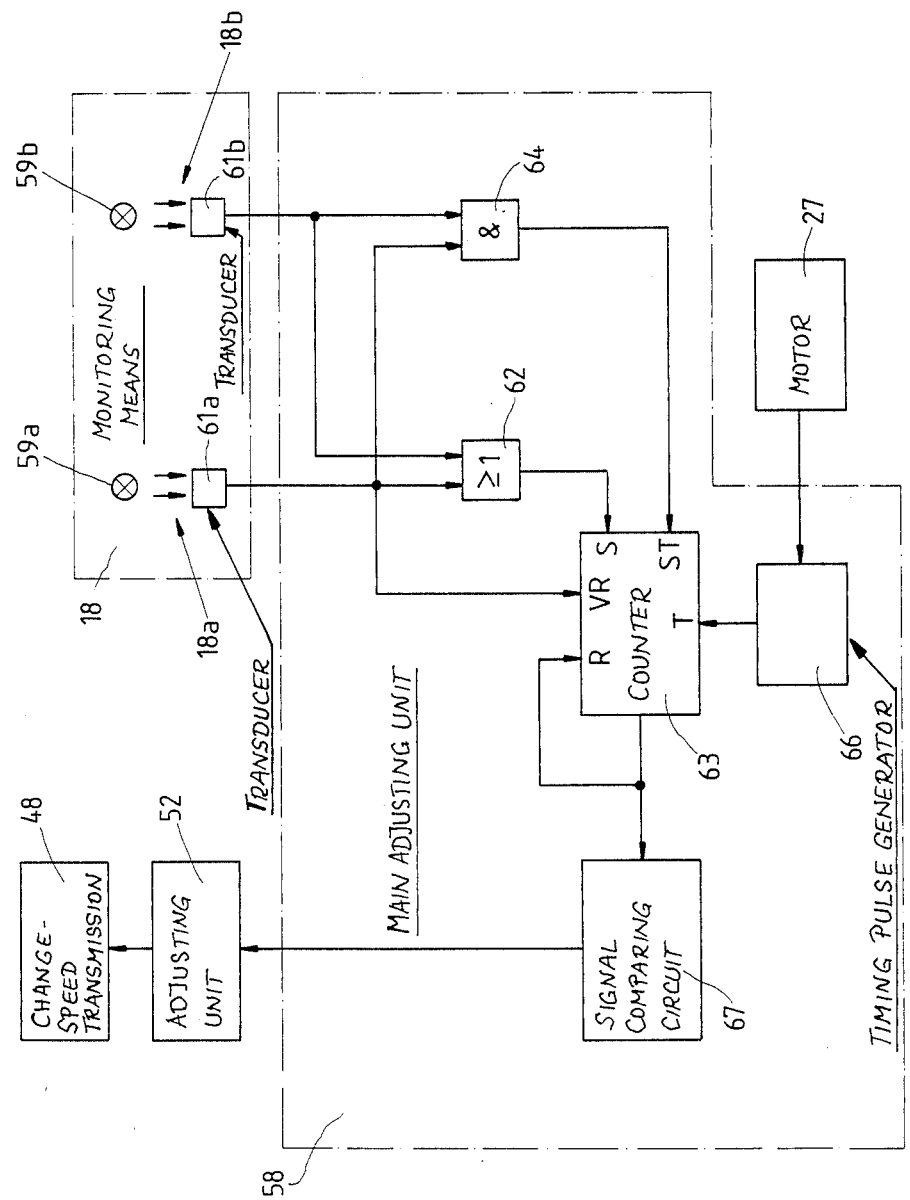
FIG. 4 is a circuit diagram of the means for adjusting the drive means for the conveyor means of the transporting means.

A presently preferred form of the adjusting unit 58 is shown schematically in FIG. 4. This unit is connected with the photoelectronic transducers 61a, 61b of the detectors 18a, 18b forming part of the monitoring means 18. The detectors 18a, 18b further comprise radiation sources 59a and 59b, respectively. The outputs of the transducers 61a, 61b are connected with the corresponding inputs of an OR gate 62 as well as with the corresponding inputs of an AND gate 64. The output of the OR gate 62 is connected with the start input S of a forward-reverse counter 63. The output of the AND gate 64 is connected with the stop input ST of the counter 63. The latter further comprises a timing input T which is connected with the output of a timing pulse generator 66 driven by the main prime mover 27. The output of the counter 63 is connected with a resetting input R as well as with the input of a signal comparing circuit 67 which transmits signals to the adjusting unit 52 for the change-speed transmission 48. The output of the transducer 61a is further connected with the forward-reverse input VR of the counter 63. The timing pulse generator 66 need not be directly coupled to the prime mover 27 as long as it transmits timing pulses at a frequency which is a function of the speed of the prime mover.

The purpose of the circuit 67 is to convert the output signal of the counter 63 into a signal which can be used to alter the ratio of the change-speed transmission 48 by way of the adjusting unit 52.

The operation is as follows:

The conveyor 1 feeds a succession of stacks 4 to the adjacent ends of the conveyors 9 and 11a in a predetermined (starting) orientation, e.g., in the orientation in which the stacks issue from the stacking unit of the production line. If the orientation of the stacks 4 which are supplied by the conveyor 1 need not be changed during travel along the paths 12a and 12b the clutches 47, 51 and 56 of the drive means for the conveyors 11a-11c remain disengaged so that the shafts 22a, 23a, 24a are respectively driven by the overrunning clutches 33, 34, 36 at the speed ($v_1$) of the conveyor 9. The orientation of stacks 4 which reach the conveyors 21a is then the same as the orientation of such stacks on the conveyors 7a.

Figure 3:
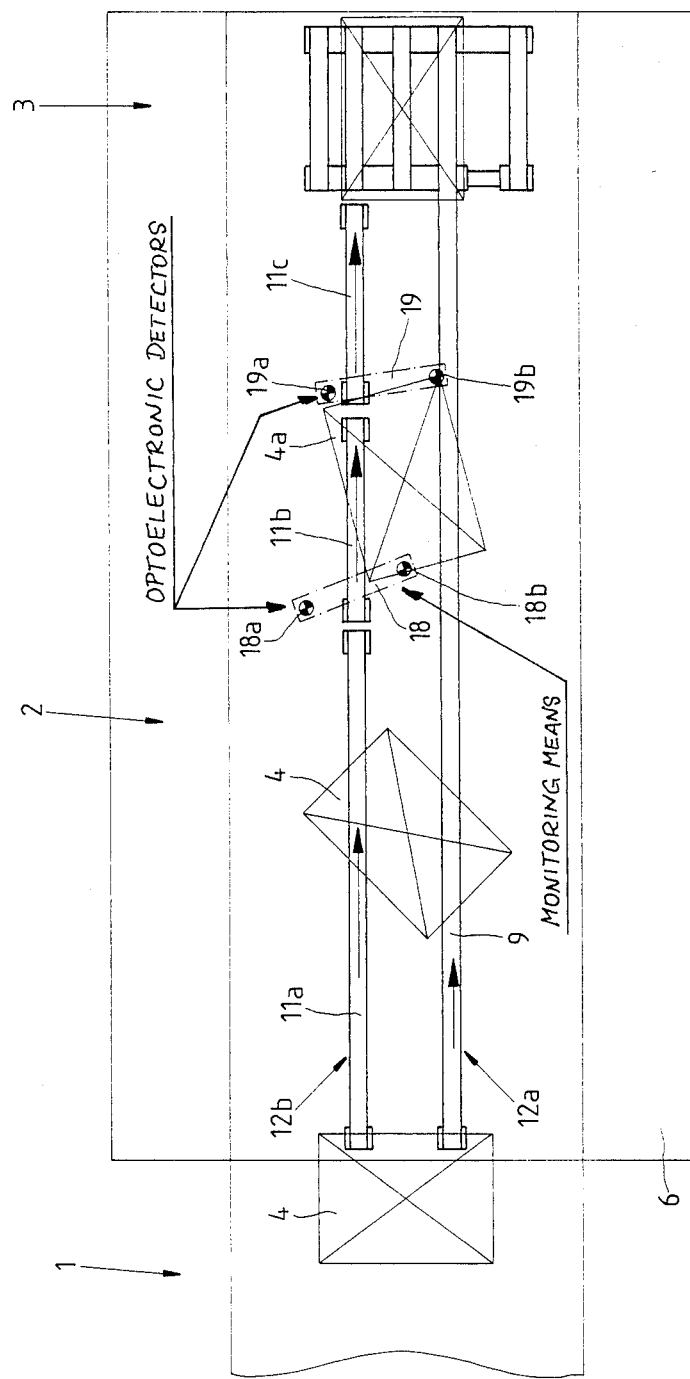
FIG. 3 shows the structure of FIG. 2 with the foremost stack on the transporting means located in the range of a second monitoring unit downstream of the first monitoring unit.

If the operator wishes to change the orientation of successive stacks, i.e., if the stacks 4 are to turn about axes extending at right angles to the planes of the respective sheets or panels, the clutches 47, 51 and 56 are engaged so that the conveyors 11a, 11b and 11c are driven at speeds $v_2$, $v_3$ and $v_4$, respectively by the change-speed transmission 37 rather than directly by the prime mover 27 and transmission 28. This means (with reference to FIGS. 2 and 3) that the part of a stack 4 which overlies the path 12b advances faster than that part of the same stack 4 which overlies the path 12a. In other words, the stacks 4 are caused to turn clockwise, as seen in FIG. 2 or 3, during travel from the conveyor 1 toward the conveyor 3. It is assumed that the ratio of the speeds $v_1$ (conveyor 9) and $v_2$ (conveyor 11a) is constant. Thus, a stack 4 which has left the conveyor 1 and advances along the paths 12a, 12b is already turned through a predetermined angle when it reaches the first monitoring means 18. This monitoring means is in the process of monitoring the orientation of the stack 4a which is shown in FIG. 2. As explained above, the (first intermediate) orientation of the stack 4a is proper if the inclination of its front side face 4F with reference to the longitudinal directions of the parallel paths 12a and 12b matches the inclination of the row of detectors 18a, 18b in the first monitoring means 18. FIG. 2 shows that the orientation of the stack 4a is unsatisfactory because the front side face 4F is inclined in such a way that it reaches the detector 18b ahead of the detector 18a. Thus, the transducer 61b of the detector 18b transmits a signal to the corresponding inputs of the gates 62, 64 before the gates 62, 64 receive a signal from the transducer 61a of the detector 18a. This means that, in order to reach the receiving conveyor 3 in a desired predetermined final orientation, the stack 4a must be caused to undergo a more pronounced change of orientation during travel along those portions of the path 12b which are defined by the conveyors 11b and 11c.

When the OR gate 62 receives the signal from the transducer 61b of the detector 18b, its output signal is transmitted to the start input S of the counter 63 so that the latter commences to count the signals which are transmitted to its input T by the timing pulse generator 66 at a frequency which is a function of the speed of the prime mover 27.

The transducer 61a transmits a signal with a delay (following the transmission of signal by the transducer 61b) which is indicative of the extent of deviation of the orientation of stack 4a from the desired first intermediate orientation. The signal from the transducer 61a causes the AND-gate 64 (which receives the signal from the transducer 61b) to transmit a signal to the stop input ST of the counter 63 which is arrested. The intensity or another characteristic of the (additional) signal at the output of the counter 63 is indicative of the difference between the desired and actual orientation of the stack 4a in the region of the monitoring means 18, i.e., such additional signal is indicative of length of the interval which has elapsed between activation of the detector 18b and actuation of the detector 18a. The additional signal is processed by the circuit 67 and is transmitted to the adjusting unit 52 for the change-speed transmission 48 whose ratio is changed in a sense to increase the speed $v_3$ of the downstream conveyor 11b so that the conveyor 11b effects a more pronounced change of orientation of the stack 4a during travel of the stack 4a along the corresponding portion of the path 12b. Under optimum operating conditions, the orientation of the stack 4a is fully corrected during travel with the conveyor 11b so that the orientation of the stack 4a during transfer onto the second downstream conveyor 11c matches the desired (second intermediate) orientation and the conveyor 11c can effect the necessary additional change of orientation to thus ensure that the (actual final) orientation of the stack 4a on arrival at the conveyor 3 will match the desired predetermined orientation.

The second monitoring means 19 is optional because, at least in many instances, a single monitoring of intermediate positions of successive stacks 4 between the conveyors 1 and 3 suffices to ensure that the final orientation of each stack will match or very closely approximate the desired predetermined orientation.

The detectors 19a, 19b of the monitoring means 19 respond when they detect the front side faces 4F of successive stacks 4 which have advanced beyond the first downstream conveyor 11b so that signals which are generated by the prototransducers of the detectors 19a, 19b, can be processed and used to change the ratio of the transmission 53 by way of the adjusting unit 57 in a manner which is, or can be, analogous to the aforedescribed manner of processing signals from the transducers 61a and 61b.

The main adjusting unit 58 comprises or can comprise a second counter which receives signals from the transducers of the detectors 19a, 19b and from the timing pulse generator 66 and transmits signals to a circuit which is analogous to the circuit 67 of FIG. 4 and serves to control the adjusting unit 57 for the change-speed transmission 53. The counter 63 and the circuit 67 of FIG. 4 can be used to process signals from the detectors 19a, 19b if the mutual spacing of successive stacks 4 on the transporting unit 2 is sufficient to ensure that the monitoring means 18 is idle when the monitoring means 19 is operative and vice versa. At any rate, the monitoring means 19 causes the second downstream conveyor 11c to change its speed $v_4$ to an extent which is a function of the extent of deviation of the orientation of a stack downstream of the conveyor 11b from the desired (second intermediate) orientation. This even more reliably ensures that the orientation of all stacks which reach the receiving conveyor 3 is the same.

If the orientation of a stack 4 which advances along the paths 12 and 12b is proper on arrival into the range of the first monitoring means 18 as well as on arrival into the range of the second monitoring means 19, the counter 63 remains idle and the speeds $v_3$ and $v_4$ of the respective downstream conveyors 11b and 11c remain unchanged. This is due to the fact that the transducers 61a, 61b of the detectors 18a, 18b then transmit signals at the same time so that the intensity of signal at the output of the counter 63 is zero. The same applies for the timing of signals which are generated by the transducers of the detectors 19a, 19b.

The forward-reverse input VR of the counter 63 can be connected with the output of the transducer 61a or 61b. The purpose of the input VR is to set the counter 63 for forward or reverse counting, i.e., to determine whether the counter will transmit a positive or a negative signal so that the ratio of the transmission 48 can be increased or reduced, depending upon the extent of inclination of the front counter 63 will transmit a negative signal (to reduce the speed $v_3$ of the conveyor 11b) if the front side face 4F of the stack 4a or another stack reaches the detector 18a prior to reaching the detector 18b because this indicates that the change of orientation during travel from the conveyor 1 to the monitoring means 18 was excessive, either because the initial orientation was unsatisfactory or because the orientation of the stack was changed excessively during travel with the upstream conveyor 11a.

The resetting input of the counter 63 receives a signal simultaneously with the transmission of a signal to the circuit 67 (which receives a signal when the AND gate 64 transmits a stop signal to the input ST). This ensures that the counter 63 is ready for the next monitoring operation which begins when the next stack 4 reaches the monitoring means 18.

The drive means of FIG. 1 establishes a fixed ratio between the speed $v_1$ of the conveyor 9 and the speed $v_2$ of the conveyor 11a. However, it is equally possible to provide an additional change-speed transmission and an adjusting unit therefor so as to enable the operator or a program to alter the ratio of $v_1$ to $v_2$. FIG. 1 shows a change-speed transmission 45 which can drive the shaft 22a for the front pulley 22 of the conveyor 11a in response to signals from an adjusting unit 45a which is controlled by the main adjusting unit 58. The adjusting unit 45a can receive signals from the circuit 67 of FIG. 4, i.e., in response to signals from the detectors 18a, 18b of the first monitoring means 18. This even more reliably ensures that the orientation of a misoriented stack can be corrected not later than when the stack reaches the receiving conveyor 3.

The monitoring means 18, 19 with pairs of photoelectronic detectors 18a, 18b and 19a, 19b can be replaced with other types of monitoring means, e.g., with monitoring means which employ mechanical sensors, electromagnetic sensors or others.

Furthermore, it is equally within the purview of the invention to select the speeds of the conveyors which define the paths 12a and 12b in such a way that speed $v_1$ exceeds the speeds $v_2$, $v_3$ and $v_4$, i.e., that a stack 4 which advances from the feeding conveyor 1 to the receiving conveyor turns in a counterclockwise direction, as seen in FIG. 2 or 3. All that counts is to establish a desirable ratio of the speed at which a first part of a stack 4 is advanced along the path 12a to the speed at which a second part of the same stack is advanced along the path 12b.

FIG. 4 shows a rather simple adjusting arrangement for regulating the speed $v_3$ of the first downstream conveyor 11b. In actual practice, the functions of elements in the block diagram of FIG. 4 will be carried out by a microprocessor or the like.

Referring again to FIG. 1, the first path 12a can be defined by two parallel conveyors including the aforementioned conveyor 9 and an additional endless belt conveyor 14. Analogously, the second path 12b can be defined by three pairs of parallel conveyors including a first (upstream) pair 11a, 13a, a second (first downstream) pair 11b, 13b and a third (second downstream) pair 11c, 13c. The conveyor 14 is driven by a pulley 72 on the shaft 26a, the conveyor 13a is driven by a pulley 68 on the shaft 22a, the conveyor 13b is driven by a pulley 69 on the shaft 23a, and the conveyor 13c is driven by a pulley 71 on the shaft 24a. In order to reduce the likelihood of damage to the lowermost sheets of stacks 4 on the conveyors 9, 14 and 11a, 13a or 9, 14 and 11b, 13b or 9, 14 and 11c, 13c, the pulleys 68, 69, 71 are respectively driven by step-down transmissions 68a, 69a, 71a and pulley 72 is driven by step-up transmission 72a which receive torque from the shafts 22a, 23a, 24a and 26a, respectively. Thus, the speed of the conveyor 14 is higher than the speed of the conveyor 9 and the speed of the conveyors 13a, 13b, 13c is less than the speed of the conveyors 11a, 11b, 11c, respectively. The difference between the speeds of the conveyors 9, 14 is proportional to the difference between the distances of the conveyors 9, 14 from the central vertical symmetry plane 15 which extends between the paths 12a, 12b or, otherwise stated, from the path 12b. Analogously, the difference between the speeds of the conveyors 11a, 11b, 11c on the one hand and the speed of the conveyors 13a, 13b, 13c on the other hand is proportional to the difference between the distances of the conveyors 11 and 13 from the symmetry plane 15 or from the path 12a.

The provision of pairs of conveyors 9, 14 and 11a–11c, 13a–13c ensures that friction between such conveyors and the lowermost sheets of the stacks 4 thereon suffices to guarantee a predictable turning of stacks during travel along the paths 12a and 12b. It is clear that the path 12a can be defined by more than two parallel conveyors (9, 14) and that the path 12b can also be defined by more than two sets (11a–11c and 13a–13c) of conveyors. This will even further reduce the likelihood of unpredictable changes in orientation of stacks 4 during travel along the paths 12a, 12b. The ratio of the speed of conveyors which define the paths 12a, 12b is then selected in the aforediscussed manner, i.e., the conveyors of the path 12b which are nearer to the symmetry plane 15 are slower than the intermediate conveyors, and the intermediate conveyors are slower than the outermost conveyors* (if the path 12a is and the conveyor of the path 12a which is nearer to the symmetry plane 15 is faster than the intermediate conveyor, and the intermediate conveyor is faster than the outermost conveyor defined by three parallel conveyors and the path 12b is defined by three sets of parallel conveyors).

In addition to or in lieu of relying on two or more parallel conveyors or on two or more parallel sets of conveyors to define the paths 12a, 12b and to reduce the likelihood of uncontrolled slippage of lowermost sheets of the stacks 2 relative to the conveyors and/or vice versa (some slippage will invariably take place while a stack changes its orientation during travel along the paths 12a and 12b), it is also possible to employ one or more foraminous belt conveyors. This is shown in FIG. 2 wherein the conveyors 9 and 11a–11c are permeable to air and cooperate with suction chambers 73 which establish a pressure differential between the upper sides and the undersides of the upper reaches of the respective conveyors to thus ensure that the lowermost sheet of a stack 4 advancing along the paths 12a and 12b is attracted to the upper sides of the upper reaches. The suction chambers 73 are connected or connectable to a suction generating device 74, e.g., a fan, a pump or the like. The utilization of foraminous conveyors, with or without the additional conveyors 14 and 13a–13c of FIG. 1, has been found to normally suffice to ensure a predictable change of orientation during travel of stacks from the feeding conveyor 1 to the receiving conveyor 3.

The change-speed transmission 37 can be of the type known as Variator ES 16 AR which is manufactured by the firm Flender of German Federal Republic. The transmission 28 can be of the type known as TYP EA II which is manufactured by the firm Tandler of German Federal Republic. The change-speed transmissions 48 and 53 can be of the type known as PE-01 manufactured by Tandler, and the adjusting units 52, 57 can constitute braking motors of the type known as OD-71 (manufactured by the firm Baumëller of German Federal Republic). Overrunning clutches (33, 34, 36) which can be used in the drive means of FIG. 1 are manufactured by the firm Stieber of German Federal Republic (such clutches are known as type SK 20). BBC produces and distributes a counter (63) which can be used in the circuit of FIG. 4 and is known as Sigmatronic b Typ R 444.3.

An important advantage of the improved method and apparatus is that the final orientation of stacks 4 is more predictable than in heretofore known apparatus. This is due to the fact that the orientation of the stacks is monitored once or more than once in one or more predetermined portions of the paths 12a, 12b and that corrective measures are undertaken by changing the speeds of the conveyors which define these paths rather than on or downstream of the receiving conveyor 3. This obviates the need for the aforediscussed mechanical and/or other orientation correcting means in the form of stops, guide rails, conveyors and the like which are needed in conventional apparatus and not only contribute to the bulk and cost of such apparatus but are also likely to affect the appearance and/or integrity of sheets. It will be seen that, in contrast to prior proposals, the apparatus of the present invention effects a required change of orientation of each stack during travel between the conveyors 1 and 3 by the novel expedient of changing the relative speeds of the conveyors which define the two paths. As described above, the adjustment or regulation of the speeds of conveyors which define the paths 12a and 12b can be such that signals which are generated by a monitoring means are used exclusively to adjust the speed ratio between the conveyor or conveyors defining the path 12a and the conveyor or conveyors which are located downstream of the monitoring station. Alternatively, the arrangement may be such that signals which are generated by a monitoring means can be used to alter the speed of a conveyor (such as 11b) downstream of the monitoring station as well as the speed of a conveyor (11a). upstream of the monitoring station (note the change-speed transmission 45 and the adjusting unit 45a in FIG. 1).

The number of conveyors or sets of parallel conveyors which define the path 12b can be reduced to two or increased to four or more without departing from the spirit of the invention. It often suffices to employ only two conveyors (e.g., the conveyors 11a and 11b) and to provide means for changing the speed of the downstream conveyor 11b while the speed of the upstream conveyor 11a remains unchanged. The illustrated apparatus is preferred at this time because of its greater versatility. Such apparatus can change the orientation of successive stacks in several stages and the orientation can be corrected at least twice before a stack reaches the conveyor 3.

Another important advantage of the improved apparatus is that it can be rapidly converted from operation for simple transport of stacks without any turning to operation for transport and simultaneous turning through a desired angle, e.g., 180°.

The extent of automation of the improved apparatus can be selected practically at will. The choice of appropriate monitoring means can be left to the maker, i.e., the monitoring means can employ optoelectronic, mechanical, electromagnetic and/or other detectors or combinations of different types of detectors.

The utilization of a combined transporting and turning unit which can change the orientation of stacks through an angle of 180° is desirable and advantageous when the transporting path is relatively long and when the stacks must cross a relatively large number of successive transfer points. In such case the turning of stacks unit is located half the way of the transporting path so that it can compensate for stray movements of the lowermost sheet or sheets of a stack relative to the other sheets. The likelihood that the lowermost sheet or sheets of a stack will move in the direction of transport out of a position of exact registry with the neighboring sheets is pronounced when the stacks must travel linearly along a long transporting path and/or cross several transfer points.

On the first half of the transporting unit where the stacks are linearly moved the lowermost sheet or sheets of the stack can move out of a position of exact registry with the neighboring sheets in the direction of the transport. The turning unit which is placed at the end of the first half of the transporting unit is used to turn the stacks through 180° and the second half of the transporting unit to further move the stacks linearly to the end of the transporting unit whereby the lowermost sheet which has been caused to move out of registry and to change its position relative to the sheets above it is caused to reassume its original position of accurate overlap with the other sheets of the same stack. Presently known methods and apparatus do not allow for automatic return movement of a misaligned sheet back to its proper position with reference to the other sheets. Heretofore, it was necessary to actually pull the lowermost sheet or sheets to their proper positions A further important advantage of the improved apparatus is its versatility and flexibility. Moreover, the apparatus is simple and its controls can be assembled of available components. The apparatus can be used For transport of stacks without any turning as well as for transport and simultaneous turning of stacks at a high frequency and through practically any desired angle.

It has been found that satisfactory friction between the lowermost sheet of a stack 4 and the adjacent upper reaches of conveyors which define the paths 12a and 12b is normally ensured solely by the expedient which is shown in FIG. 1 (wherein each of the two paths is defined by two parallel conveyors or by two sets of parallel conveyors) or solely by the expedient which is shown in FIG. 2 (foraminous belt conveyors which cooperate with suction chambers). However, and if the nature of the sheets and/or the finish of the conveyors is such that it is necessary to undertake several measures in order to avoid stray movements of sheets relative to the conveyors, the just enumerated expedients can be incorporated in one and the same apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of turning stacks of paper sheets or the like, comprising the steps of establishing parallel elongated first and second paths, said first path being defined by a first conveyor means and said second path being defined by a plurality of independently controlled second conveyor means; delivering successive stacks into first portions of the paths in a predetermined starting orientation so that a first part of each stack overlies the first path while a second part of the stack simultaneously overlies the second path; advancing the first and second parts of successive stacks from the first portions of the respective paths in the same direction but at different speeds so that the stacks are turned as a result of the difference in speeds of their first and second parts and their orientation is changed from the starting orientation to an intermediate orientation; monitoring the intermediate orientation of successive stacks in second portions of the paths downstream of the first portions; comparing the monitored orientation of successive stacks with a reference value denoting the desired orientation of stacks in the second portions of said paths; and changing the speed of advancement of the second part of a stack along the second path downstream of the second portion of the first path independently of the speed of advancement from the first portion of the second path by changing the speed of one of said second conveyor means located downstream of the second portion of the second path independently of the speed of another of said second conveyor means located upstream of the second portion of the second path when the monitored orientation of such stack deviates from the desired orientation so that each stack assumes a predetermined final orientation not later than upon completion of advancement along said paths.

2. The method of claim 1, wherein said speed changing step includes increasing or reducing the speed of the parts of stacks overlying said first path only downstream of the second portion of the first path.

3. The method of claim 1, wherein said speed changing step further includes increasing or reducing the speed of the parts of stacks overlying said first path upstream of the second portion of said first path.

4. The method of claim 1, wherein said speed changing step includes reducing the speed of advancement of the first part of stack.

5. Apparatus for turning stacks of paper sheets or the like, comprising means for transporting successive stacks in a predetermined direction, including a first conveyor defining an elongated first path and a plurality of second conveyors jointly defining successive sections of an elongated second path which is parallel to and adjacent the first path; adjustable drive means for driving said conveyors in a predetermined direction at different speeds so that a stack which is deposited in a predetermined starting orientation on said first conveyor and simultaneously rests on at least one of said second conveyors is turned when the first conveyor and the one second conveyor means are driven at different speeds; means for monitoring the orientation of stacks in predetermined portions of said first and second paths and for generating signals denoting the monitored orientation of stacks; and means for adjusting said drive means in response to said signals so as to cause each stack to assume a predetermined final orientation not later than upon completion of advancement along said first and second paths, said second conveyors including at least one upstream conveyor disposed ahead of the predetermined portion of said second path and at least one downstream conveyor disposed past the predetermined portion of said second path, said adjusting means including means for changing the difference between the speed of said first conveyor and the speed of said downstream conveyor when the monitored orientation of a stack deviates from a desired intermediate orientation.

6. The apparatus of claim 5, wherein said adjusting means includes means for changing the speed of said downstream conveyor.

7. The apparatus of claim 5, wherein said adjusting means further includes means for changing the difference between the speed of said first conveyor means and the speed of said upstream conveyor so that the orientation of a stack following a previously monitored stack matches or approximates a desired intermediate orientation on arrival of the following stack in the predetermined portions of said first and second paths.

8. The apparatus of claim 7, wherein said adjusting means includes means for changing the speed of said upstream conveyor.

9. The apparatus of claim 5, wherein said monitoring means comprises a plurality of signal generating detectors forming a row which is inclined with reference to said predetermined direction.

10. The apparatus of claim 9, wherein said detectors include optoelectronic transducers.

11. The apparatus of claim 9, wherein one of said detectors is arranged to generate a signal ahead of another of said detectors when the orientation of a stack arriving in said predetermined portions of said paths deviates from a predetermined intermediate orientation, said monitoring means further comprising means for generating additional signals denoting the length of intervals between the generation of signals by said one and said other detector, said adjusting means being responsive to said additional signals, said additional signals being indicative of the extent of deviation of monitored orientation of stacks from said predetermined intermediate orientation.

12. The apparatus of claim 9 for turning stacks each of which has side faces one of which is first to reach said portions of said paths, said detectors being arranged to monitor the orientation of said one side face of each stack which reaches said portions of said paths.

13. The apparatus of claim 5, wherein said drive means comprises a power train for said conveyors, overrunning clutches between said power train and said second conveyors, variable-speed transmission means driven by said power train, and additional clutch means for connecting said transmission means with at least one of said second conveyors, said adjusting means including means for changing the ratio of said transmission means.

14. The apparatus of claim 13, wherein said drive means further comprises an additional variable-speed transmission for another of said second conveyors.

15. The apparatus of claim 5, wherein said drive means comprises a power train for said conveyors, overrunning clutches between said power train and said second conveyors, variable-speed transmission means, and additional clutches for connecting said transmission means with at least one of said second conveyors, said adjusting means including means for changing the ratio of said transmission means.

16. The apparatus of claim 5, wherein each of said conveyors comprises an endless belt or chain conveyor.

17. The apparatus of claim 5, wherein said drive means includes means for driving said conveyors at different speeds such that a stack which is advanced along said first and second paths changes its orientation through an angle which equals or approximates 180 degrees.

18. The apparatus of claim 5, wherein said transporting means constitutes one element of an elongated production line having additional elements including means for feeding stacks to said paths and means for receiving stacks from said paths, said transporting means being disposed substantially midway between the ends of said elongated production line.

19. The apparatus of claim 5, wherein at least one of said conveyors comprises an endless foraminous conveyor and means for establishing a pressure differential across said foraminous conveyor so that the latter attracts that part of a stack which advances along the respective path.

20. The apparatus of claim 5, wherein at least one of said conveyors comprises a plurality of parallel endless belt or chain conveyors.

21. The apparatus of claim 20, wherein said parallel conveyors define one of said paths and one of said parallel conveyors is nearer to the other of said paths than the other of said parallel conveyors, said drive means including means for driving said one conveyor at a speed less than the other of said conveyors.

22. The apparatus of claim 21, wherein said driving means includes means for driving said conveyors at speeds which differ from each other to an extent proportional to differences between the distances of said conveyors from said other path.

* * * * *